Sept. 16, 1958     H. A. MATTHIAS     2,852,318
MOTOR VEHICLE DRIVELINE MOUNTING Filed May 31, 1955     3 Sheets-Sheet 1

INVENTOR.
H. A. MATTHIAS.
BY E. C. McRae.
J. R. Faulkner.
T. H. Oster.
ATTYS.

Sept. 16, 1958  H. A. MATTHIAS  2,852,318
MOTOR VEHICLE DRIVELINE MOUNTING
Filed May 31, 1955  3 Sheets-Sheet 2
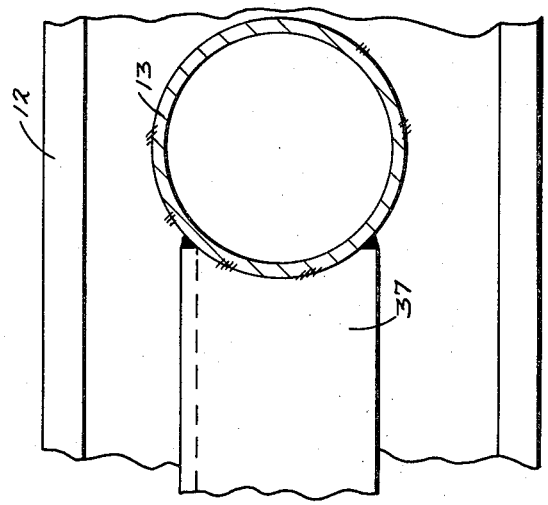
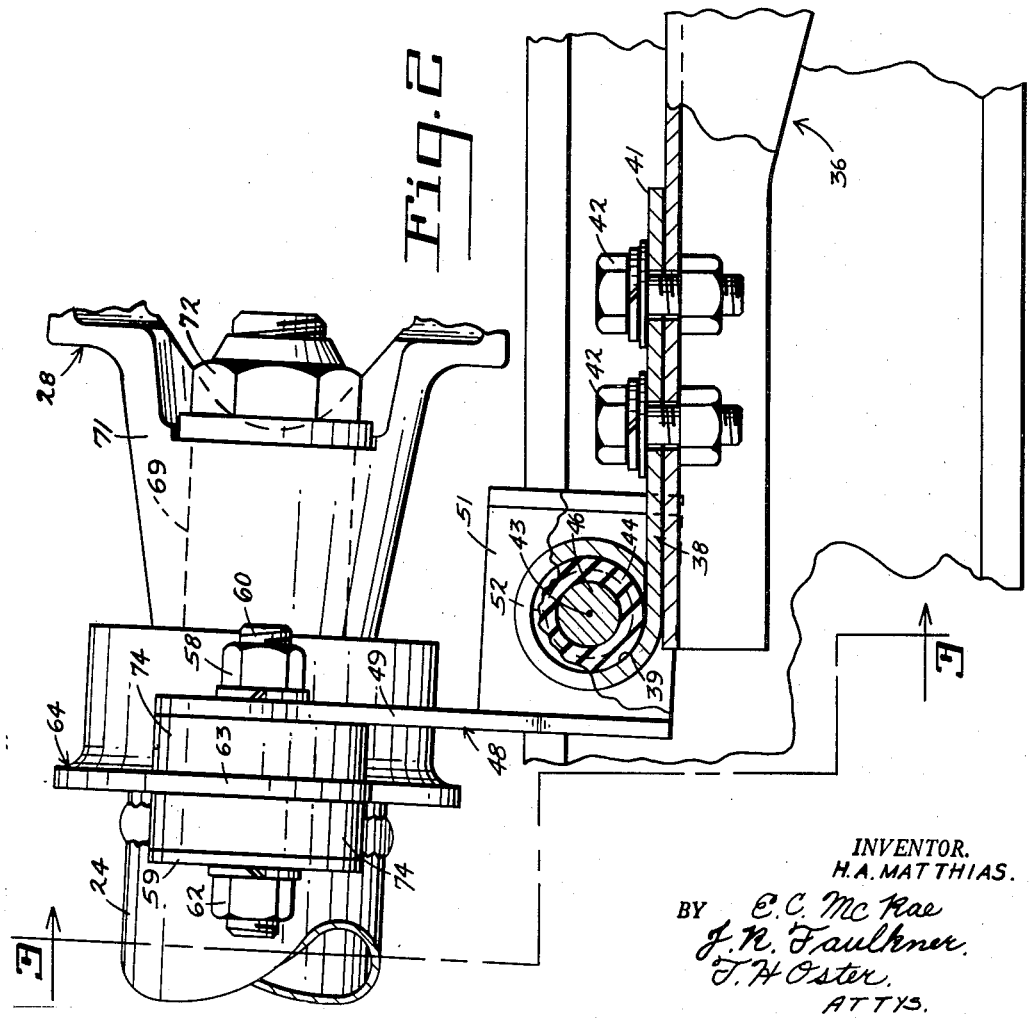
INVENTOR.
H.A. MATTHIAS.
BY E.C. McRae
J.R. Faulkner.
T.H. Oster.
ATTYS.

Sept. 16, 1958  H. A. MATTHIAS  2,852,318
MOTOR VEHICLE DRIVELINE MOUNTING
Filed May 31, 1955  3 Sheets-Sheet 3

INVENTOR.
H. A. MATTHIAS.
BY E.C. McRae.
J. R. Faulkner.
T. H. Oster.
ATTYS.

United States Patent Office 2,852,318
Patented Sept. 16, 1958

2,852,318

MOTOR VEHICLE DRIVELINE MOUNTING

Hans A. Matthias, Birmingham, Mich., assignor to Ford Motor Company, Dearborn, Mich., a corporation of Delaware Application May 31, 1955, Serial No. 511,838

3 Claims. (Cl. 308—28)

This invention relates generally to a pivotal driveline mounting for a motor vehicle.

Motor vehicles utilizing front and rear drive shafts and three universal joints between the engine and the rear axle require a bearing for the driveline adjacent the center or mid-joint. This bearing should be resiliently mounted to dampen vibrations originating in the driveline. In addition, in a vehicle utilizing a Hotchkiss type of rear wheel suspension, axle and spring movements result in longitudinal movement of the driveline, and the mid-joint mount must accommodate such movement. The construction of the present invention achieves such objectives by providing a combined pivotal and resilient mounting for the driveline, incorporating a pivotal connection between the driveline and the vehicle frame having an axis extending substantially normal to the axis of the driveline. In an embodiment of the invention a bearing housing is provided having a central portion supporting a ball bearing assembly rotatably receiving the driveline. The bearing housing has laterally extending portions apertured to receive and embrace a pair of resilient members carried by a pair of laterally spaced vertically extending hinge members which in turn are pivotally connected to a frame bracket for rotation about a horizontal transversely extending axis located beneath the driveline.

Other objects and advantages of this invention will be made more apparent as this description proceeds, particularly when considered in connection with the accompanying drawings, wherein:

Figure 2 is an enlarged side elevational view, partly broken away and in section, of the mounting shown in Figure 1.

Figure 4:
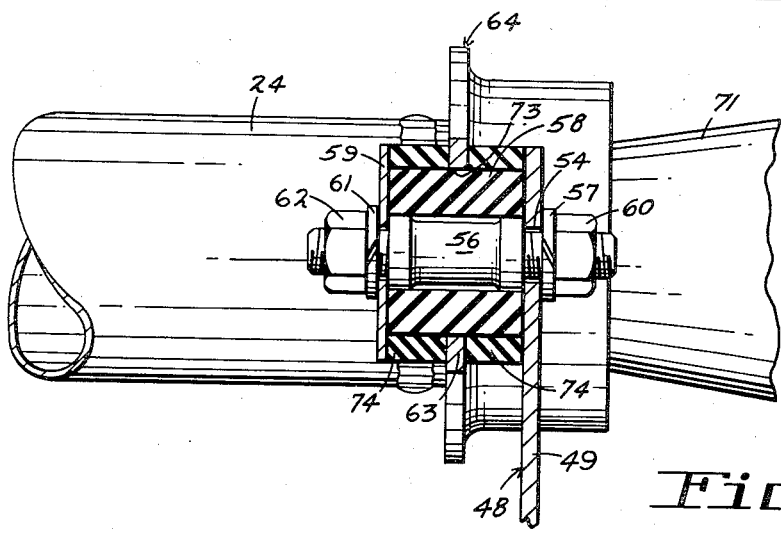
Figure 3:
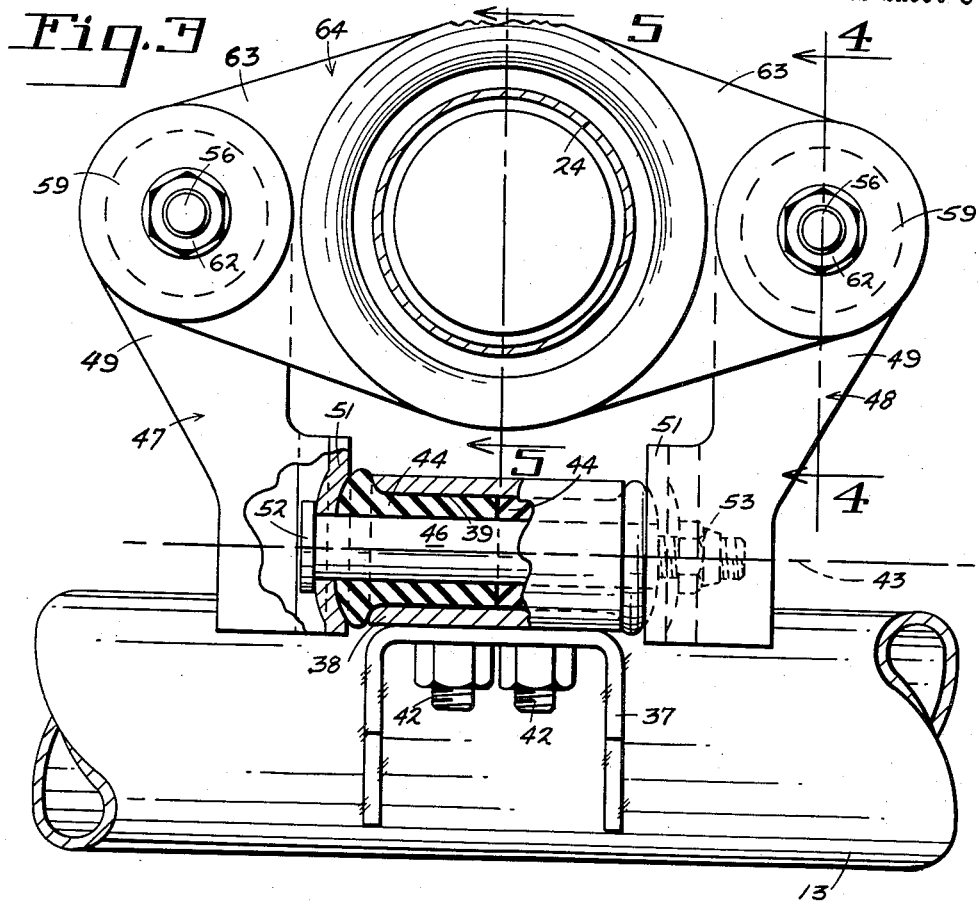
Figure 3 is a front elevational view, partly in section, as viewed substantially from the line 3—3 of Figure 2.
Figure 5:
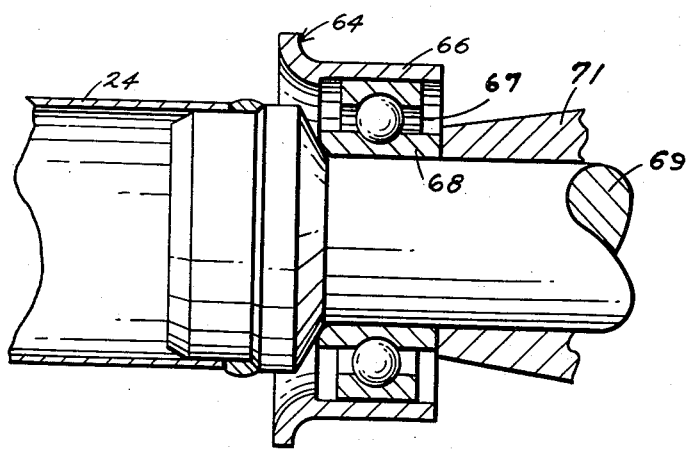

Figures 4 and 5 are cross sectional views taken on the planes indicated by the lines 4—4 and 5—5 of Figure 3.

Figure 1:
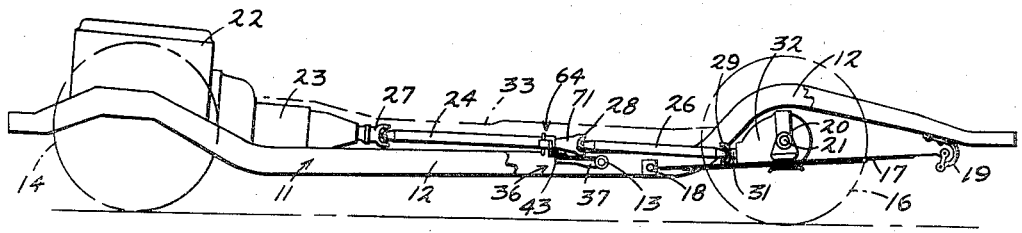
Figure 1 is a side elevational view of a vehicle chassis having a three joint driveline incorporating the mounting of the present invention.

Referring now to the drawings, and particularly to Figure 1, the reference character 11 indicates generally a motor vehicle frame having side frame rails 12 and an intermediate tubular cross frame member 13 extending transversely therebetween. Front and rear road wheels 14 and 16 are provided, the latter being supported upon the vehicle frame by means of longitudinally extending leaf springs 17 connected at their ends to the vehicle frame by means of spring hangers 18 and 19, and connected intermediate their ends to axle tubes 20 housing axle shafts 21.

The rear road wheels 16 are driven by means of a power train including an engine 22, transmission 23, and front and rear drive shafts 24 and 26. A universal joint 27 interconnects the transmission 23 and front drive shaft 24, and a second universal joint 28 interconnects the front and rear drive shafts 24 and 26 respectively. The rear drive shaft 26 is connected by means of a third universal joint 29 to a pinion shaft 31 journaled in the rear axle housing 32 and connected by means of conventional differential gearing (not shown) to the axle shafts 21 for the rear wheels 16.

It will be noted that the construction shown utilizes a Hotchkiss drive for the rear road wheels, and incorporates a three joint driveline to permit the floor tunnel 33 to be as low as possible. A mid-joint mounting 36 rotatably supports the rearward end of the front drive shaft 24 adjacent the center universal joint 28. Reference is made to Figures 2 to 5 inclusive for a more complete description of this mounting.

A mounting bracket 37, generally of inverted channel shape, is welded at its rearward end to the central portion of the tubular cross frame member 13, and projects forwardly therefrom generally in alignment with the longitudinal center line of the vehicle. At its forward end the mounting bracket 37 supports a gudgeon 38 having an eye portion 39 and a flat base portion 41. The base 41 of the gudgeon is secured to the upper wall of the mounting bracket 37 by means of bolts 42. The gudgeon 38 is arranged so that its axis 43 extends horizontally and transversely of the vehicle frame beneath the mid-joint 28.

As best seen in Figure 3, a pair of aligned rubber bushings 44 are sleeved within the eye portion 39 and rotatably receive a pintle 46. The pintle forms a pivot shaft for a pair of hinge members 47 and 48, the latter being identical except for being reversed.

The hinge members 47 and 48 each have a flat vertically and transversely extending body portion 49 and a reversely bent lower flange 51 positioned adjacent the flanged ends of the rubber bushings 44. The flanges 51 of the hinge members 47 and 48 are generally parallel to each other and extend vertically and longitudinally of the vehicle. The flanges are apertured to receive the extending ends of the pintle 46 and are dished to accommodate the flanged ends of the rubber bushings 44. The pintle 46 is provided with an enlarged head 52 at one end and with a nut 53 at the other end to complete the hinge assembly.

As best seen in Figure 4, the upper ends of the flat body portions 49 of the hinge members 47 and 48 are formed with apertures 54 receiving shouldered studs 56 mounted thereon by means of washers 57 and nuts 60. Each shouldered stud 56 supports a resilient rubber bushing 58 sleeved thereon and held between the flat body portion 49 of the hinge member and a flat washer 59 assembled upon the opposite end of the stud 56 and held thereon by means of a washer 61 and a nut 62.

The outer peripheries of the two rubber bushings 58 carried by the hinge members 47 and 48 resiliently support the side flanges 63 of a bearing housing 64. The bearing housing 64 has an integrally formed sleeve portion 66 housing a ball bearing assembly 67 having an inner race 68 sleeved upon the reduced extension 69 of the front drive shaft 24, the extension being inserted into the rearward end of the drive shaft 24 and welded thereto. The extension 69 carries the front yoke 71 of the universal joint 28, the latter being held thereon by means of a nut 72 threaded upon the end of the drive shaft extension 69.

Referring again to Figure 4, it will be noted that each of the laterally extending side flanges 63 of the bearing housing 64 is formed with a circular aperture 73 embracing the periphery of the adjacent rubber bushing 58. A pair of rubber sleeves 74 are assembled upon the periphery of the bushing 58 on opposite sides of the side flange 63 of the bearing housing, and resiliently center the latter with respect to the bushing 58.

It will be apparent from the foregoing that the mid-joint mounting 36 incorporates a pivotal connection between the driveline and the vehicle frame with the axis of this pivotal connection extending perpendicular to the axis of the driveline. The axis is shown in the embodiment as extending horizontally beneath the driveline, although the mounting could be in other positions as long as the axis remained substantially perpendicular to the axis of the driveline. This pivotal mounting, in combination with the resilient mounting afforded by the rubber bushings 58 and sleeves 74, accommodates the limited axial movement of the drive shafts resulting from axle movement relative to the frame as well as from distortion and windup of the rear leaf springs 17. In addition, the mounting dampens vibrations originating in the driveline.

It will be understood that the invention is not to be limited to the exact construction shown and described, but that various changes and modifications may be made without departing from the spirit and scope of the invention, as defined in the appended claims.

What is claimed is:

1. A mounting for supporting a motor vehicle driveline upon a vehicle frame member comprising a driveline support having two oppositely extending flanges, a cantilever arm being attached to and extending longitudinally of the vehicle from said frame member, said arm supporting at its free end an axle housing having a resilient bushing therein, said axle housing being aligned transversely of the vehicle and having an axle member extending therethrough, said axle member pivotably supporting at each end a hinge member, each of said hinge members being connected to and spaced longitudinally of the vehicle from one of said oppositely extending flanges with the axis of connection being longitudinal of the vehicle, resilient mountings being interposed between said hinge members and flanges with said flanges being supported by resilient portions transversely and longitudinally of the vehcle.

2. The structure defined by claim 1, which is further characterized in that each of said resilient mountings comprises a longitudinal extending stud secured to one of said hinge members, a resilient bushing mounted on said stud and supporting said flange, a pair of resilient sleeves mounted on said resilient bushing on opposite sides and adjacent to said flange, and locking means for holding said resilient bushing and said resilient sleeves to said stud and said flange respectively.

3. A mounting for supporting a motor vehicle driveline upon a vehicle frame member comprising a bearing housing, a bearing assembly carried by said bearing housing and rotatably supporting said driveline, said bearing housing having a pair of flanges projecting radially outwardly from the axis of said driveline in opposite directions, a mounting bracket attached to and extending longitudinally of the vehicle from said frame member, a gudgeon mounted to said bracket and defining a transverse eye portion, pivot means mounted within said eye portion including a pair of aligned rubber bushings and a pintle extending through said bushings, said pintle pivotally supporting at each end a hinge member, each of said hinge members being connected to and spaced longitudinally of the vehicle from each of said oppositively extending flanges with the axis of connection being longitudinal of the vehicle, resilient mountings interposed between said hinge members and flanges, each mounting including a cylindrical resilient bushing mounted on a stud, said stud being attached to a hinged member, said bushing supporting said flange and damping the movement of said flange in a vertical and transverse direction only, and a pair of resilient sleeves mounted on said resilient bushing on opposite sides and adjacent to said flange, and locking means including a nut and washer holding said resilient sleeves and said bushing to said stud and said flange, said resilient sleeves damping said flange in a fore and aft movement only, each of said hinge members limitedly movable through said pivot means and said resilient mountings.

References Cited in the file of this patent

UNITED STATES PATENTS

| 2,450,279 | Guy | Sept. 28, 1948 |
| 2,560,759 | Evernden et al. | July 17, 1951 |

FOREIGN PATENTS

| 629,502 | Great Britain | Sept. 21, 1949 |